US011339986B2

(12) United States Patent
Tatei

(10) Patent No.: US 11,339,986 B2
(45) Date of Patent: May 24, 2022

(54) REMOTE CONTROLLER AND AIR-CONDITIONING APPARATUS

(71) Applicant: Mitsubishi Electric Corporation, Tokyo (JP)

(72) Inventor: Shuichi Tatei, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 80 days.

(21) Appl. No.: 16/652,090

(22) PCT Filed: Dec. 12, 2017

(86) PCT No.: PCT/JP2017/044571
§ 371 (c)(1),
(2) Date: Mar. 30, 2020

(87) PCT Pub. No.: WO2019/116448
PCT Pub. Date: Jun. 20, 2019

(65) Prior Publication Data
US 2020/0248917 A1   Aug. 6, 2020

(51) Int. Cl.
*F24F 11/30* (2018.01)
*F24F 11/64* (2018.01)
(Continued)

(52) U.S. Cl.
CPC .............. *F24F 11/30* (2018.01); *F24F 11/52* (2018.01); *F24F 11/56* (2018.01); *F24F 11/64* (2018.01);
(Continued)

(58) Field of Classification Search
CPC ........ F24F 11/30; F24F 11/56; F24F 2120/12; G05B 2219/2614; H04W 4/029;
(Continued)

(56) References Cited

U.S. PATENT DOCUMENTS

2006/0273887 A1* 12/2006 Yamamoto .............. B60R 25/24
340/426.36
2011/0276185 A1* 11/2011 Watanabe ................ F24F 3/153
700/278
(Continued)

FOREIGN PATENT DOCUMENTS

EP          3236166 A2    10/2017
JP       2006-283999 A    10/2006
(Continued)

OTHER PUBLICATIONS

International Search Report of the International Searching Authority dated Mar. 6, 2018 for the corresponding International application No. PCT/JP2017/044571 (and English translation).
(Continued)

*Primary Examiner* — Darrin D Dunn
(74) *Attorney, Agent, or Firm* — Posz Law Group, PLC

(57) ABSTRACT

A remote controller includes a wireless communication unit wirelessly communicating with a wireless device transmitting sensor information serving as an environmental index for an air-conditioning target space for an air-conditioning apparatus and wirelessly communicating with an information terminal transmitting user-set operation information of a user of the air-conditioning apparatus; an air-conditioning control unit transmitting the sensor information and the user-set operation information to a main body of the air-conditioning apparatus; and a mode switching unit switching between a client mode in which the sensor information is acquired from the wireless device and a server mode in which the user-set operation information is received from the information terminal and provides air-conditioning control information corresponding to the user-set operation information to the information terminal.

11 Claims, 6 Drawing Sheets

(51) Int. Cl.
*F24F 11/65* (2018.01)
*F24F 11/56* (2018.01)
*F24F 11/52* (2018.01)
*G05B 19/042* (2006.01)
*F24F 120/20* (2018.01)
*F24F 110/10* (2018.01)

(52) U.S. Cl.
CPC ............ *F24F 11/65* (2018.01); *G05B 19/042* (2013.01); *F24F 2110/10* (2018.01); *F24F 2120/20* (2018.01); *G05B 2219/2614* (2013.01)

(58) Field of Classification Search
CPC ......... H04W 4/80; H04W 4/02; H04W 64/00; H04W 12/06; H04W 12/08; H04W 48/08; H04W 4/027; H04W 36/32; H04W 48/02; H04W 48/04; H04W 4/025
See application file for complete search history.

(56) References Cited

U.S. PATENT DOCUMENTS

| | | | | |
|---|---|---|---|---|
| 2014/0191848 A1* | 7/2014 | Imes | ................... | H04B 5/0037 340/10.5 |
| 2016/0128119 A1* | 5/2016 | Maheshwari | ........... | H04W 4/80 370/329 |
| 2016/0154413 A1 | 6/2016 | Trivedi et al. | | |
| 2016/0265799 A1* | 9/2016 | Matsuno | ................... | G05F 1/66 |
| 2018/0338330 A1* | 11/2018 | Ledvina | ................ | H04W 8/005 |
| 2019/0041080 A1 | 2/2019 | Higuchi et al. | | |

FOREIGN PATENT DOCUMENTS

| | | |
|---|---|---|
| JP | 2016-111540 A | 6/2016 |
| JP | 2017-146065 A | 8/2017 |
| JP | 2017-203598 A | 11/2017 |
| WO | 2017/081721 A1 | 5/2017 |

OTHER PUBLICATIONS

Extended European Search Report dated Nov. 3, 2020 issued in corresponding EP patent application No. 17934966.7.
Office Action dated Dec. 15, 2020 issued in corresponding JP patent application No. 2019-559448 (and English translation).

* cited by examiner

REMOTE CONTROLLER AND AIR-CONDITIONING APPARATUS

CROSS REFERENCE TO RELATED APPLICATION

This application is a U.S. national stage application of PCT/JP2017/044571 filed on Dec. 12, 2017, the contents of which are incorporated herein by reference.

TECHNICAL FIELD

The present disclosure relates to a remote controller that receives an instruction regarding air-conditioning control and an air-conditioning apparatus including the remote controller.

BACKGROUND ART

Conventionally, regarding an air-conditioning apparatus that includes an outdoor unit and an indoor unit, a user operates a remote controller to operate an operating state of the indoor unit, so that the air-conditioning apparatus can be operated. In accordance with a widespread use of information communication devices, cases have been assumed where an air-conditioning apparatus is remotely operated by a user using a portable terminal such as a smartphone as well as using a conventional controller represented by a remote controller. In such a case, both an operation on a remote controller equipped for the air-conditioning apparatus and an operation on the portable terminal need to be performed in a compatible manner.

An example of an apparatus that performs both an operation on a remote controller and an operation on a portable terminal in a compatible manner is disclosed in Patent Literature 1. An electric home appliance in Patent Literature 1 includes a wireless communication unit that receives operation instruction information from an information communication terminal device and a controller that controls, when receiving a remote controller signal for starting an operation from a remote controller, the electric home appliance in accordance with the remote controller signal. The controller is configured to activate a remote controller priority mode during a period from reception of the remote controller signal to a time when a specific time has passed since the reception of the remote controller signal and deactivate the remote controller priority mode when the specific time has passed. With this configuration, both a remote operation using the portable terminal and an operation by the remote controller can be performed in a compatible manner.

CITATION LIST

Patent Literature

Patent Literature 1: Japanese Unexamined Patent Application Publication No. 2016-111540

SUMMARY OF INVENTION

Technical Problem

Some air-conditioning apparatuses include a wireless communication function. Such air-conditioning apparatuses not only receive an operation from a portable terminal but also communicate with a sensor tag including a wireless communication function to acquire information such as temperature of an air-conditioning target space. It is desirable that such air-conditioning apparatuses continuously collect information from the sensor tag so that the air-conditioning target space can be controlled to a more comfortable environment.

However, while the air-conditioning apparatus is communicating with the sensor tag, the air-conditioning apparatus cannot communicate with the portable terminal. Therefore, a user of the air-conditioning apparatus needs to operate the remote controller to perform an operation for switching communication connection from connection to the sensor tag to connection to the portable terminal, and usability is thus reduced. By applying the technique disclosed in Patent Literature 1, causing the remote controller to temporarily stop communication with the sensor tag at specific time intervals and to enter a state in which the remote controller is able to be connected through communication with the portable terminal may be considered. In this case, the user needs to wait for the timing at which the remote controller stops communication with the sensor tag.

The remote controller and the air-conditioning apparatus have been made to overcome the problem mentioned above, and aim to provide a remote controller and an air-conditioning apparatus that are able to perform a remote operation using an information terminal and collection of information regarding environment from an air-conditioning target space at the same time.

Solution to Problem

A remote controller according to an embodiment of the present disclosure includes: a wireless communication unit wirelessly communicating with a wireless device transmitting sensor information serving as an environmental index for an air-conditioning target space for an air-conditioning apparatus and wirelessly communicating with an information terminal transmitting user-set operation information of a user of the air-conditioning apparatus; an air-conditioning control unit transmitting the sensor information and the user-set operation information to a main body of the air-conditioning apparatus; and a mode switching unit switching between a client mode, in which the sensor information is acquired from the wireless device, and a server mode, in which the user-set operation information is received from the information terminal and the mode switching unit provides air-conditioning control information corresponding to the user-set operation information to the information terminal.

An air-conditioning apparatus according to an embodiment of the present disclosure includes a heat-source-side unit and a load-side unit connected by a refrigerant circuit; and the remote controller mentioned above connected to the heat-source-side unit and the load-side unit.

Advantageous Effects of Invention

According to an embodiment of the present disclosure, a user does not need to perform an operation for allowing a remote controller to switch between allowing a remote operation by an information terminal and allowing collection of sensor information from a wireless device. Therefore, the burden on the user for performing such an operation can be reduced.

DESCRIPTION OF EMBODIMENTS

Embodiment 1

Figure 1:
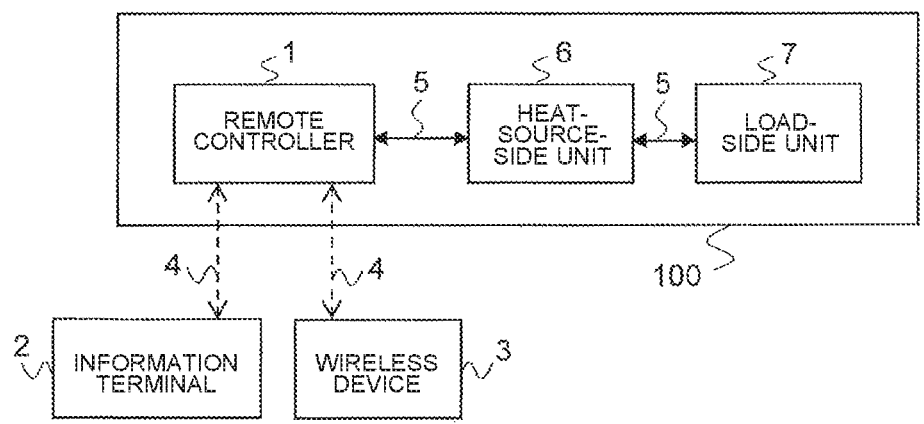
FIG. 1 is a diagram illustrating a configuration example of an air-conditioning apparatus including a remote controller according to Embodiment 1 of the present disclosure.

An air-conditioning apparatus to which a remote controller according to Embodiment 1 is applied will be explained. FIG. 1 is a diagram illustrating a configuration example of an air-conditioning apparatus including the remote controller according to Embodiment 1 of the present disclosure. As illustrated in FIG. 1, an air-conditioning apparatus 100 includes a remote controller 1, a heat-source-side unit 6, and a load-side unit 7. The heat-source-side unit 6 and the load-side unit 7 correspond to a main body of the air-conditioning apparatus 100. The remote controller 1 is connected to the heat-source-side unit 6 and the load-side unit 7 via a transmission line 5 and communicates with the heat-source-side unit 6 and the load-side unit 7 in a bidirectional manner. Furthermore, the remote controller 1 is connected to an information terminal 2 and a wireless device 3 via a wireless communication line 4 and communicates with the information terminal 2 and the wireless device 3 in a bidirectional manner.

The information terminal 2 is an information processing terminal used by a user of the air-conditioning apparatus 100. The wireless device 3 is a device that provides sensor information including information serving as an environmental index for an air-conditioning target space to the remote controller 1.

Through the wireless communication line 4, communication is performed according to a communication protocol defined by a communication method such as, for example, Bluetooth®, BLE (Bluetooth® Low Energy), and Wi-Fi®. Communication through the wireless communication line 4 may be based on standards other than the communication methods mentioned above. The transmission line 5 meets standards such as, for example, Ethernet®. However, the transmission line 5 may be based on other standards.

Figure 2:
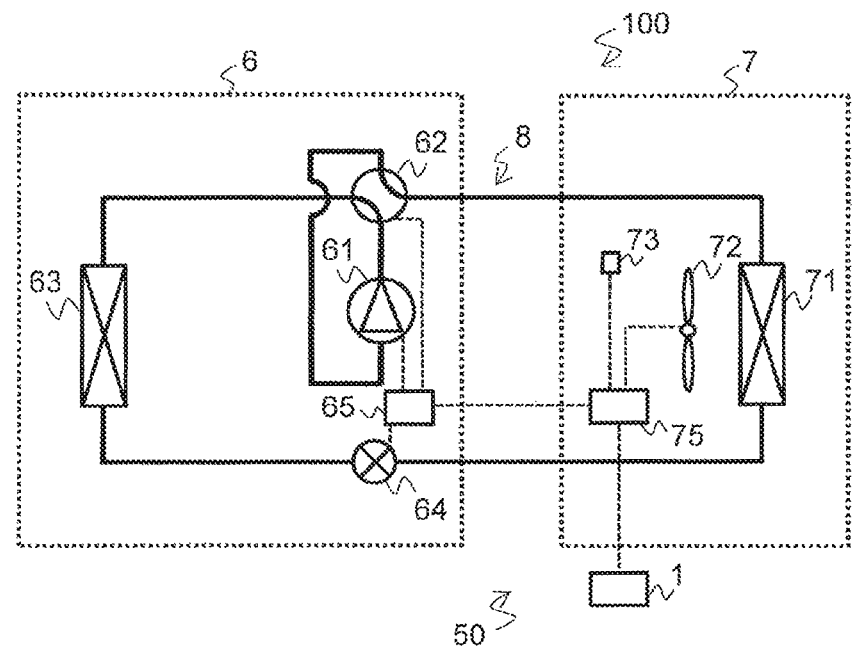
FIG. 2 is a refrigerant circuit diagram illustrating a configuration example of a heat-source-side unit and a load-side unit illustrated in FIG. 1.

FIG. 2 is a refrigerant circuit diagram illustrating a configuration example of the heat-source-side unit and the load-side unit illustrated in FIG. 1. The heat-source-side unit 6 includes a compressor 61 that compresses refrigerant and discharges the compressed refrigerant, a four-way valve 62 that switches a flow passage for refrigerant, a heat-source-side heat exchanger 63, an expansion valve 64, and a controller 65. The load-side unit 7 includes a load-side heat exchanger 71, an indoor fan 72, an indoor sensor 73, and a controller 75. The compressor 61, the four-way valve 62, the heat-source-side heat exchanger 63, the expansion valve 64, and the load-side heat exchanger 71 are connected by a refrigerant pipe, so that a refrigerant circuit 8 through which refrigerant circulates can be configured.

The compressor 61 is an inverter compressor whose capacity is variable. The four-way valve 62 switches the direction in which refrigerant flows, according to an operation mode, a heating operation or a cooling operation. The heat-source-side heat exchanger 63 is a heat exchanger that exchanges heat between refrigerant and outdoor air. The expansion valve 64 decompresses and expands refrigerant. The expansion valve 64 is, for example, an electronic expansion valve. The load-side heat exchanger 71 is a heat exchanger that exchanges heat between refrigerant and indoor air. The indoor fan 72 supplies indoor air to the load-side heat exchanger 71. The indoor sensor 73 measures temperature and humidity of indoor air and outputs measurement values to the controller 75.

The controllers 65 and 75 each include a memory and a CPU (Central Processing Unit), which are not illustrated in the drawing. The controllers 65 and 75 each transmit a measurement value of a sensor including the indoor sensor 73 to the remote controller 1. The controller 65 controls the compressor 61, the four-way valve 62, and the expansion valve 64 in accordance with air-conditioning control information received from the remote controller 1. The controller 75 controls the indoor fan 72 in accordance with air-conditioning control information received from the remote controller 1.

Although not illustrated in FIG. 2, a fan that supplies outdoor air to the heat-source-side heat exchanger 63 may be provided at the heat-source-side unit 6. Furthermore, a temperature sensor that measures temperature of refrigerant may be provided at each of the heat-source-side heat exchanger 63 and the load-side heat exchanger 71. In this case, the controller 75 may control the degree of subcooling and the degree of superheat, based on temperatures measured by the temperature sensors. Furthermore, the remote controller 1 and the controllers 65 and 75 constitute an air-conditioning control device 50 in an integrated manner. The remote controller 1 may include functions of the controllers 65 and 75.

Figure 3:
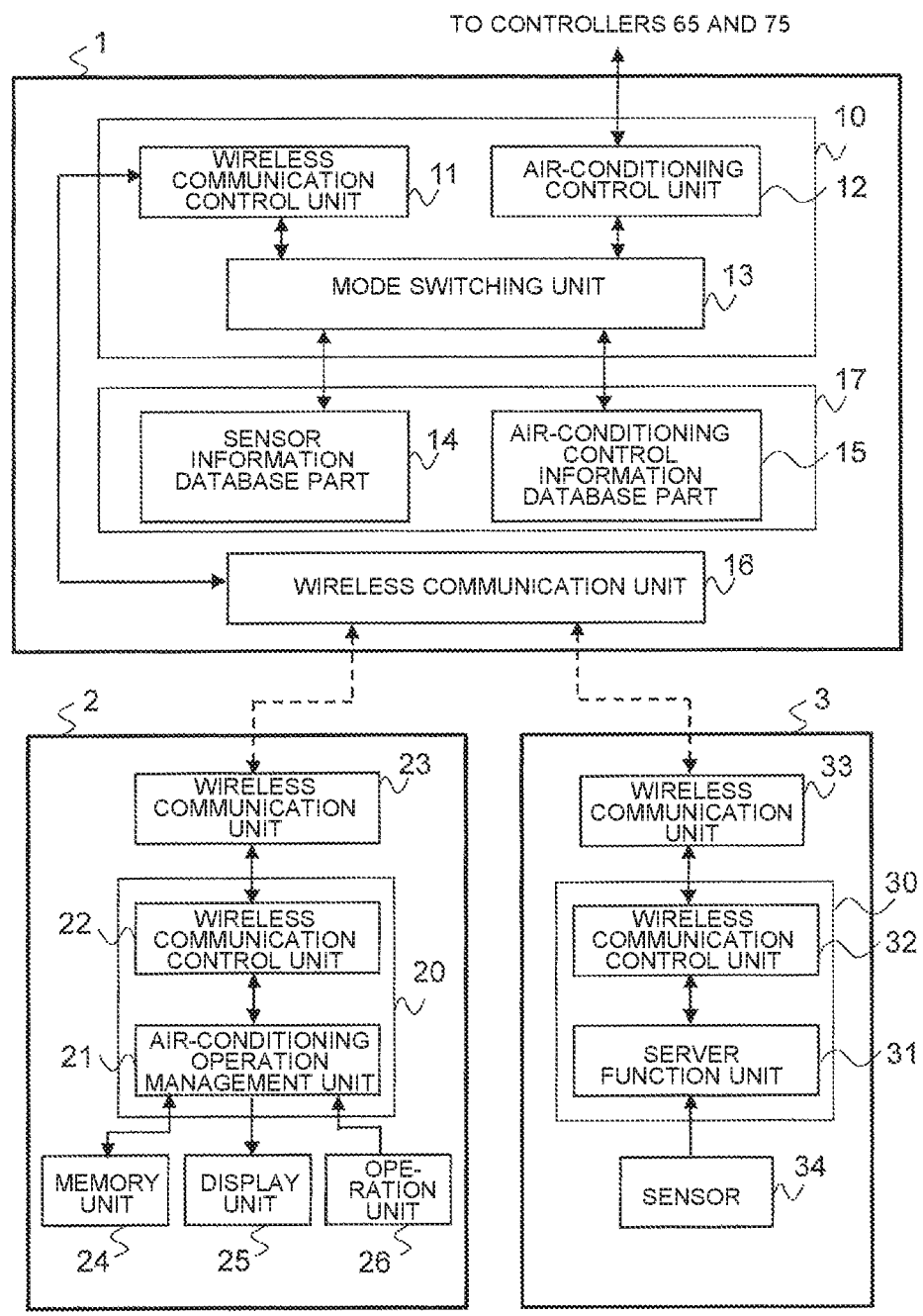
FIG. 3 is a functional block diagram illustrating a configuration example of a remote controller, an information terminal, and a wireless device illustrated in FIG. 1.

Next, the configuration of the remote controller 1, the information terminal 2, and the wireless device 3 will be explained in detail. FIG. 3 is a functional block diagram illustrating a configuration example of the remote controller, the information terminal, and the wireless device illustrated in FIG. 1.

The remote controller 1 includes a controller 10, a memory unit 17, and a wireless communication unit 16. The wireless communication unit 16 includes an antenna circuit and an amplification circuit, which are not illustrated in the drawing. The wireless communication unit 16 packetizes data and transmits and receives the packetized data to and from other devices in a wireless manner. The memory unit 17 includes a sensor information database part 14 and an air-conditioning control information database part 15.

The air-conditioning control information database part 15 stores user-set operation information acquired from the information terminal 2 and air-conditioning control information corresponding to the user-set operation information. The user-set operation information represents information set for the air-conditioning apparatus 100 by a user. The user-set operation information represents, for example, information such as ON and OFF of a power source, an operation mode, a set temperature, a set humidity, the direction of wind, and the amount of wind of the air-conditioning apparatus 100.

The air-conditioning control information represents a value of a control parameter of a refrigeration cycle in the refrigerant circuit 8 illustrated in FIG. 2. The control parameter represents information regarding control for each device, such as the rotation speed of the compressor 61 and the rotation speed of the indoor fan 72. The air-conditioning control information is generated by an air-conditioning control unit 12. Air-conditioning control information to be stored in the air-conditioning control information database part 15 may be acquired from the heat-source-side unit 6 and the load-side unit 7. The air-conditioning control information acquired from the heat-source-side unit 6 and the load-side unit 7 represents information indicating information of results of air-conditioning control performed for these units.

The sensor information database part 14 stores sensor information provided by the wireless device 3. The sensor information may include measurement values obtained by sensors provided at the heat-source-side unit 6 and the load-side unit 7. A sensor may be provided at the remote controller 1. In this case, the sensor information include a measurement value of the sensor at the remote controller 1. Sensor information acquired from the remote controller 1 and the wireless device 3 is, for example, information of temperature and humidity of an air-conditioning target space. Sensor information acquired from the heat-source-side unit 6 and the load-side unit 7 is, for example, information of temperature of air sucked by a fan.

Although not illustrated in the drawing, the controller 10 includes a memory that stores a program and a CPU that executes processing in accordance with the program. The controller 10 includes a wireless communication control unit 11, the air-conditioning control unit 12, and a mode switching unit 13. When the CPU executes the program, the wireless communication control unit 11, the air-conditioning control unit 12, and the mode switching unit 13 are configured at the remote controller 1.

The wireless communication control unit 11 performs communication control for the wireless communication line 4. The wireless communication control unit 11 transmits and receives packets and performs processing including packet re-transmission and error correction. The air-conditioning control unit 12 generates air-conditioning control information for controlling the heat-source-side unit 6 and the load-side unit 7 based on sensor information and user-set operation information, and transmits the generated air-conditioning control information to the controllers 65 and 75. A function of the air-conditioning control unit 12 may be provided at the controller 65 or the controller 75, in place of the remote controller 1. In this case, the air-conditioning control unit 12 transmits the sensor information and the user-set operation information to the controller 65 or the controller 75 that is provided with a function for generating air-conditioning control information based on the sensor information and the user-set operation information.

The mode switching unit 13 switches between a client mode, in which the remote controller 1 requests another device for information, and a server mode, in which the remote controller 1 provides information in accordance with a request from another device. The client mode and the server mode will now be explained. As a form of a computer system that uses a communication network, a client server system has been known. In the client server system, a server that provides information and a client that uses information provided from the server are connected via a network, and processing is performed such that the server responds to a request from the client. The remote controller 1 adopts such a client server system as a model. The remote controller 1 includes two modes, a client mode in which the remote controller 1 functions as the client and a server mode in which the remote controller 1 functions as the server, and switches between the modes according to a device to which the remote controller 1 is connected through communication.

The mode switching unit 13 manages access to information stored in the sensor information database part 14 and the air-conditioning control information database part 15. In the client mode, the mode switching unit 13 acquires sensor information from the wireless communication control unit 11 and then stores the sensor information into the sensor information database part 14. In the case where sensor information has already been stored in the sensor information database part 14, the mode switching unit 13 updates the sensor information. In the server mode, the mode switching unit 13 acquires user-set operation information from the wireless communication control unit 11 and then stores the user-set operation information into the air-conditioning control information database part 15. In the case where user-set operation information has already been stored in the air-conditioning control information database part 15, the mode switching unit 13 updates the user-set operation information.

The mode switching unit 13 acquires sensor information from the air-conditioning control unit 12 and then stores the sensor information into the sensor information database part 14. In the case where sensor information has already been stored in the sensor information database part 14, the mode switching unit 13 updates the sensor information. The mode switching unit 13 acquires air-conditioning control information from the air-conditioning control unit 12 and then stores the air-conditioning control information into the air-conditioning control information database part 15. In the case where air-conditioning control information has already been stored in the air-conditioning control information database part 15, the mode switching unit 13 updates the air-conditioning control information. The mode switching unit 13 provides information stored in the sensor information database part 14 and the air-conditioning control information database part 15 to the wireless communication control unit 11 and the air-conditioning control unit 12.

The sensor information is transmitted and received between the remote controller 1 and the wireless device 3 via the wireless communication line 4. The user-set operation information and the air-conditioning control information are transmitted and received between the remote controller 1 and the information terminal 2 via the wireless communication line 4. Furthermore, the sensor information and the air-conditioning control information are transmitted and received between the remote controller 1, the heat-source-side unit 6, and the load-side unit 7 via the transmission line 5.

Next, a configuration of the wireless device 3 will be explained with reference to FIG. 3. The wireless device 3 is, for example, a sensor tag including a sensor 34 for measuring an environmental index. In this case, information serving as environmental indices represents, for example, temperature and humidity. The wireless device 3 includes the sensor 34, a controller 30, a server function unit 31, a wireless communication control unit 32, and a wireless communication unit 33. The wireless communication unit 33 includes an antenna circuit and an amplification circuit, which are not illustrated in the drawing. The wireless communication unit 33 packetizes data and transmits and receives the packetized data to and from other devices in a wireless manner. The sensor 34 is not necessarily sensors that measure temperature and humidity of an air-conditioning target space. The sensor 34 may be a sensor that measures another type of environmental index. Furthermore, a plurality of sensors 34 may be provided at the wireless device 3. The plurality of sensors 34 may include, for example, a temperature sensor, a humidity sensor, and a refrigerant leakage sensor.

Although not illustrated in the drawing, the controller 30 includes a memory that stores a program and a CPU that executes processing in accordance with the program. The controller 30 includes the server function unit 31 and the wireless communication control unit 32. When the CPU executes the program, the server function unit 31 and the wireless communication control unit 32 are configured at the wireless device 3.

The server function unit 31 operates as the server mode for providing sensor information to the remote controller 1. Specifically, the server function unit 31 causes the sensor 34 to measure environmental indices such as temperature and humidity of an air-conditioning target space in a constant cycle, and transmits measurement values as sensor information to the remote controller 1. The wireless communication control unit 32 performs communication control for the wireless communication line 4. The wireless communication control unit 32 transmits and receives packets and performs processing including packet re-transmission and error correction.

The case where the wireless device 3 is a sensor tag has been explained above with reference to FIG. 3. However, the wireless device 3 is not necessarily a sensor tag. The wireless device 3 may be, for example, a human detection sensor in which the sensor 34 detects whether or not a human is present in a monitoring target space and include a camera that captures an image of the monitoring target space. In this case, when the human detection sensor detects that a human is present in the monitoring target space, the wireless device 3 causes the camera to capture an image of the monitoring target space. The wireless device 3 transmits sensor information including one or both of information indicating presence or absence of a human detected and a captured image to the remote controller 1. Furthermore, the wireless device 3 may be a wireless relay device that relays wireless communication between a plurality of sensor tags and the remote controller 1. In this case, the wireless device 3 collects a plurality of pieces of sensor information from the plurality of sensor tags through wireless communication, and transmits the collected plurality of pieces of sensor information to the remote controller 1 through wireless communication.

Next, a configuration of the information terminal 2 will be explained with reference to FIG. 3. The information terminal 2 is a computer that includes a wireless communication function. The information terminal 2 is, for example, a wearable computer, a smartphone, or a tablet terminal.

The information terminal 2 includes a controller 20, a wireless communication unit 23, a memory unit 24, a display unit 25, and an operation unit 26. The memory unit 24 is, for example, a nonvolatile memory such as a flash memory. The memory unit 24 stores an air-conditioning operation program, which is an application software program that allows a user to operate running of the air-conditioning apparatus 100. The display unit 25 is, for example, a liquid crystal display. The operation unit 26 is, for example, a touch panel. The wireless communication unit 23 includes an antenna circuit and an amplification circuit, which are not illustrated in the drawing. The wireless communication unit 23 packetizes data and transmits and receives the packetized data to and from other devices in a wireless manner.

The controller 20 includes a memory and a CPU, which are not illustrated in the drawing. The controller 20 includes an air-conditioning operation management unit 21 and a wireless communication control unit 22. When an instruction to execute the air-conditioning operation program is input to the controller 20 via the operation unit 26, the CPU reads the air-conditioning operation program from the memory unit 24 onto the memory, and executes the air-conditioning operation program. When the CPU executes the air-conditioning operation program, the air-conditioning operation management unit 21 and the wireless communication control unit 22 are configured at the information terminal 2.

The wireless communication control unit 22 performs communication control for the wireless communication line 4. The wireless communication control unit 22 transmits and receives packets and performs processing including packet re-transmission and error correction. When an instruction to perform a running operation is input via the operation unit 26, the air-conditioning operation management unit 21 transmits user-set operation information including information regarding the input running operation to the remote controller 1. When the air-conditioning operation management unit 21 receives the air-conditioning control information from the remote controller 1, the air-conditioning operation management unit 21 generates information indicating an operating state based on the air-conditioning control information. The air-conditioning operation management unit 21 causes the display unit 25 to display the operating state.

FIG. 3, which is a functional block diagram, has been described above with the case where the controllers 10, 20, and 30 illustrated in FIG. 3 are configured when a CPU provided in each device executes a program, as described above. However, the functional block diagram illustrated in FIG. 3 is not limited to this configuration. Part or all of a plurality of units included in each of the controllers 10, 20, and 30 illustrated in FIG. 3 may be configured as a dedicated semiconductor integrated circuit such as an ASIC (Application Specific Integrated Circuit). Furthermore, the information terminal 2 may be an electronic device with another function as a main purpose, as long as the information terminal 2 has the functions described above with reference to FIG. 3. The information terminal 2 may be, for example, a portable game machine. Furthermore, the information terminal 2 is not necessarily a portable terminal. The information terminal 2 may be an electric home appliance such as a television set.

Figure 4:
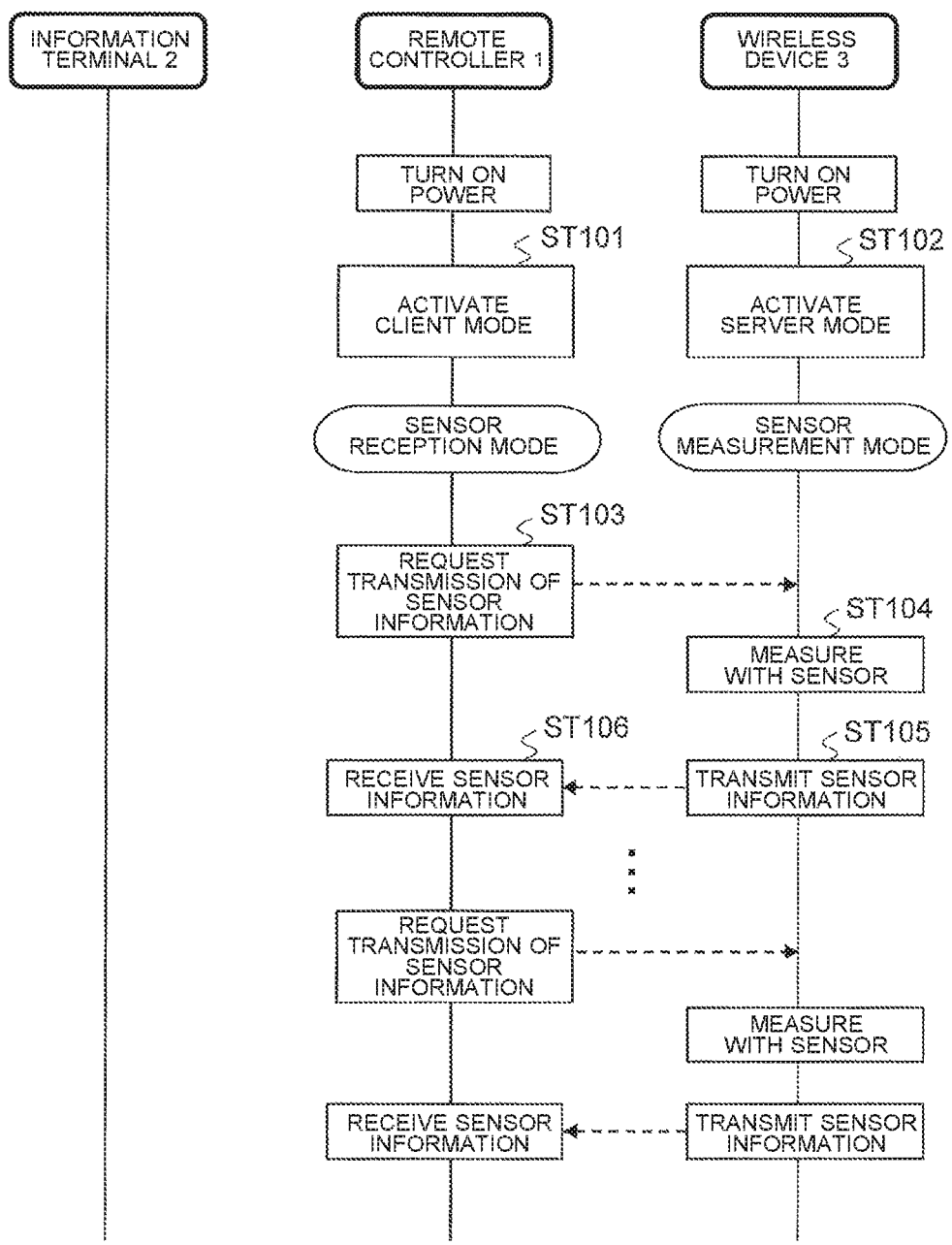
FIG. 4 is a sequence diagram illustrating an operation procedure in which a remote controller acquires sensor information from a wireless device.

Next, an operation of the remote controller 1 will be explained. As an example of an operation, an operation of the remote controller 1 for acquiring sensor information from the wireless device 3 will be explained. FIG. 4 is a sequence diagram illustrating an operation procedure in which the remote controller acquires sensor information from the wireless device.

When power is applied to the remote controller 1, the mode switching unit 13 activates the client mode (step ST101). Accordingly, the mode switching unit 13 is shifted to a sensor reception mode. The sensor reception mode is a mode in which the mode switching unit 13 stores sensor information acquired from the wireless device 3 into the sensor information database part 14 and updates sensor information stored in the sensor information database part 14.

When power is applied to the wireless device 3, the server function unit 31 activates the server mode (step ST102). Accordingly, the wireless device 3 is shifted to a sensor measurement mode. The sensor measurement mode is a mode in which the server function unit 31 causes the sensor 34 to perform measurement and provides sensor information including a measurement result to the remote controller 1.

To acquire the sensor information from the wireless device 3, the mode switching unit 13 of the remote controller 1 transmits a sensor information transmission request to the wireless device 3 via the wireless communication line 4 in a constant cycle (step ST103). Wireless communication is performed by the wireless communication control unit 11 and the wireless communication unit 16.

When the wireless device 3 receives the sensor information transmission request, the server function unit 31 causes the sensor 34 to perform measurement (step ST104). The server function unit 31 generates the sensor information including the measurement result of the sensor 34. Wireless communication is performed by the wireless communication control unit 32 and the wireless communication unit 33.

The server function unit 31 transmits the sensor information to the remote controller 1 via the wireless communication line 4 (step ST105). Wireless communication is performed by the wireless communication control unit 32 and the wireless communication unit 33.

The mode switching unit 13 of the remote controller 1 receives the sensor information from the wireless device 3 (step ST106), stores the acquired sensor information into the sensor information database part 14, and updates the sensor information stored in the sensor information database part 14. After that, steps ST103 to ST106 are repeated in a constant cycle.

In the sequence diagram illustrated in FIG. 4, even if the remote controller 1 transmits a sensor information transmission request to the wireless device 3, the wireless device 3 may provide sensor information to the remote controller 1. In this case, the server function unit 31 of the wireless device 3 performs sensor measurement in ST104 and sensor information transmission in step ST105 in a constant cycle. The mode switching unit 13 of the remote controller 1 performs reception of the sensor information from the wireless device 3 (step ST106) in a constant cycle.

Figure 5:
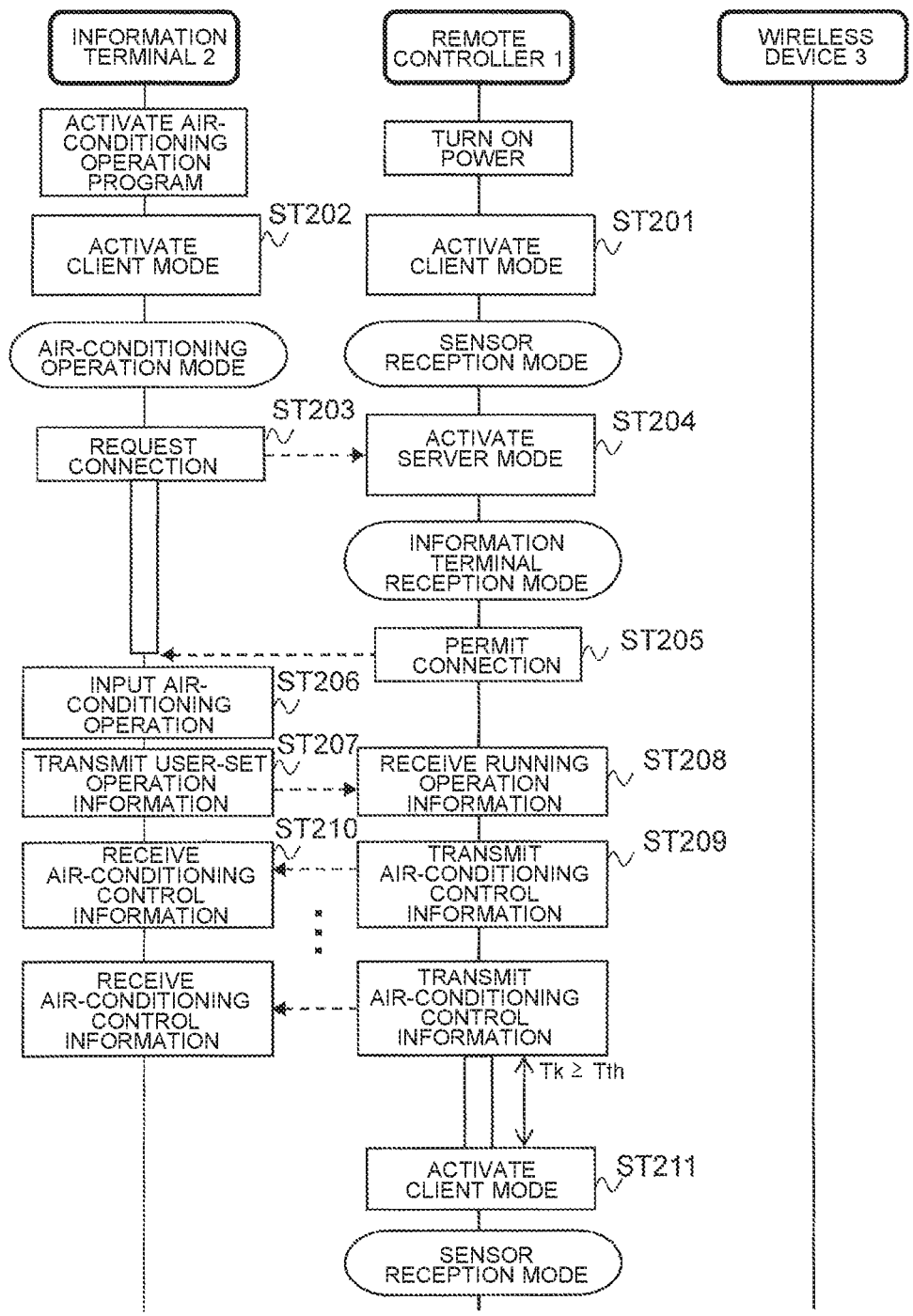
FIG. 5 is a sequence diagram illustrating an operation procedure in which a remote controller acquires user-set operation information from an information terminal and an information terminal acquires air-conditioning control information from the remote controller.

Next, an operation of the remote controller 1 for acquiring user-set operation information from the information terminal 2 and an operation of the information terminal 2 for acquiring air-conditioning control information from the remote controller 1 will be explained. FIG. 5 is a sequence diagram illustrating an operation procedure in which the remote controller acquires user-set operation information from the information terminal and the information terminal acquires air-conditioning control information from the remote controller.

When power is applied to the remote controller 1, the mode switching unit 13 activates the client mode (step ST201). Accordingly, the mode switching unit 13 is shifted to the sensor reception mode.

When a user of the air-conditioning apparatus 100 operates the information terminal 2 to input an instruction to execute the air-conditioning operation program, the controller 20 executes the air-conditioning operation program to activate the air-conditioning operation management unit 21. Then, the air-conditioning operation management unit 21 activates the client mode (step ST202). The air-conditioning operation management unit 21 is shifted to an air-conditioning operation mode in which the air-conditioning operation management unit 21 provides user-set operation information to the remote controller 1 and acquires air-conditioning control information from the remote controller 1.

The air-conditioning operation management unit 21 requests the remote controller 1 for connection (step ST203). Wireless communication is performed by the wireless communication control unit 22 and the wireless communication unit 23.

When the remote controller 1 receives a connection request from the information terminal 2, the mode switching unit 13 stops the client mode and activates the server mode (step ST204). Accordingly, the remote controller 1 is shifted to an information terminal reception mode. The information terminal reception mode is a mode in which the mode switching unit 13 provides user-set operation information to the air-conditioning control unit 12 and acquires air-conditioning control information from the remote controller 1.

The mode switching unit 13 notifies, via the wireless communication line 4, the information terminal 2 of permission for connection (step ST205). Wireless communication is performed by the wireless communication control unit 11 and the wireless communication unit 16.

When the air-conditioning operation management unit 21 of the information terminal 2 receives permission for connection from the remote controller 1, the information terminal 2 enters a state in which the user of the air-conditioning apparatus 100 is able to input a running operation, and starts to acquire user-set operation information (step ST206).

When a running operation is input via the operation unit 26, the air-conditioning operation management unit 21 transmits user-set operation information including information of the input running operation to the remote controller 1 via the wireless communication line 4 (step ST207). Wireless communication is performed by the wireless communication control unit 22 and the wireless communication unit 23.

When the mode switching unit 13 of the remote controller 1 receives the user-set operation information from the information terminal 2 (step ST208), the mode switching unit 13 of the remote controller 1 rewrites user-set operation information stored in the air-conditioning control information database part 15 into the received user-set operation information and thus updates the user-set operation information. When the user-set operation information stored in the air-conditioning control information database part 15 is updated, the air-conditioning control unit 12 generates air-conditioning control information based on the updated user-set operation information and sensor information stored in the sensor information database part 14. Then, the air-conditioning control unit 12 transmits the generated air-conditioning control information to the controllers 65 and 75. The air-conditioning control unit 12 stores the air-conditioning control information acquired from the heat-source-side unit 6 and the load-side unit 7 into the air-conditioning control information database part 15.

The mode switching unit 13 reads the latest air-conditioning control information stored in the air-conditioning control information database part 15 from the memory unit 17, and transmits the read air-conditioning control information to the information terminal 2 via the wireless communication line 4 (step ST209). Wireless communication is performed by the wireless communication control unit 11 and the wireless communication unit 16.

When the air-conditioning operation management unit 21 of the information terminal 2 receives the air-conditioning control information (step ST210), the air-conditioning operation management unit 21 of the information terminal 2 generates information indicating an operating state based on the air-conditioning control information, and causes the display unit 25 to display the operating state. After that, every time that the user of the air-conditioning apparatus 100 operates the information terminal 2 to input a running operation, the processing of steps ST207 to ST209 is performed.

The mode switching unit 13 of the remote controller 1 measures an elapsed time Tk since the last communication with the information terminal 2. In the case where no user-set operation information is received from the information terminal 2 before the elapsed time Tk has reached a set time Tth at which the elapsed time Tk times out, the mode switching unit 13 stops the server mode and activates the client mode (step ST211). Accordingly, the mode switching unit 13 is shifted to the sensor reception mode and resumes communication with the wireless device 3. When the wireless device 3 resumes communication with the remote controller 1, the wireless device 3 transmits all the measurement values obtained by the sensor 34 during a period in which the wireless device 3 was not able to communicate with the remote controller 1 to the remote controller 1. In the case where communication between the remote controller 1 and the information terminal 2 is interrupted during the set time Tth, transition from the server mode to the client mode is performed. Thus, collection of sensor information from the wireless device 3 is resumed, and the time during which environment of an air-conditioning target space cannot be monitored can be prevented from being extended.

The wireless device 3 may dispose of measurement values obtained by the sensor 34 during a period in which the wireless device 3 was not able to communicate with the remote controller 1 and transmit the latest measurement value obtained by the sensor 34 to the remote controller 1. This is because, from the view point of air-conditioning control, the latest environmental index is more important than past environmental indices for an air-conditioning target space. However, in the case where the air-conditioning control unit 12 controls air-conditioning while referring to histories indicating changes with time in sensor information, it is desirable to acquire from the wireless device 3 all the measurement values obtained by the sensor 34 during a period in which communication with the wireless device 3 was not able to be performed.

As explained above with reference to FIG. 5, even when the remote controller 1 is in the sensor reception mode, the remote controller 1 is switched from the client mode to the server mode if a connection request is received from the information terminal 2. Therefore, the user of the air-conditioning apparatus 100 is able to operate the information terminal 2 to operate running of the air-conditioning apparatus 100 even when the remote controller 1 is in the sensor reception mode.

Figure 6:
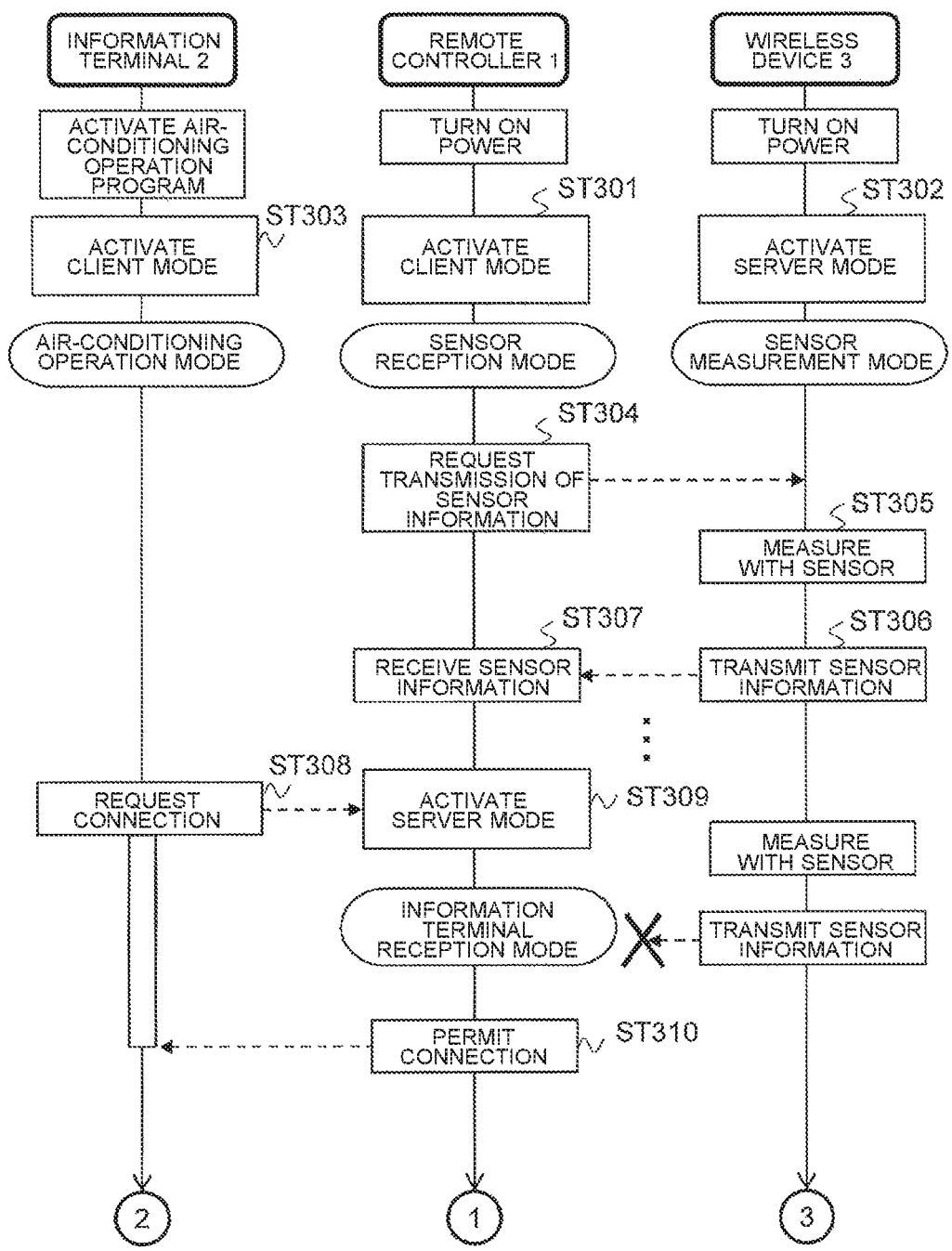
FIG. 6 is a sequence diagram illustrating an operation procedure in which a remote controller transmits and receives information while switching communication connection between connection to a wireless device and connection to an information terminal.
Figure 7:
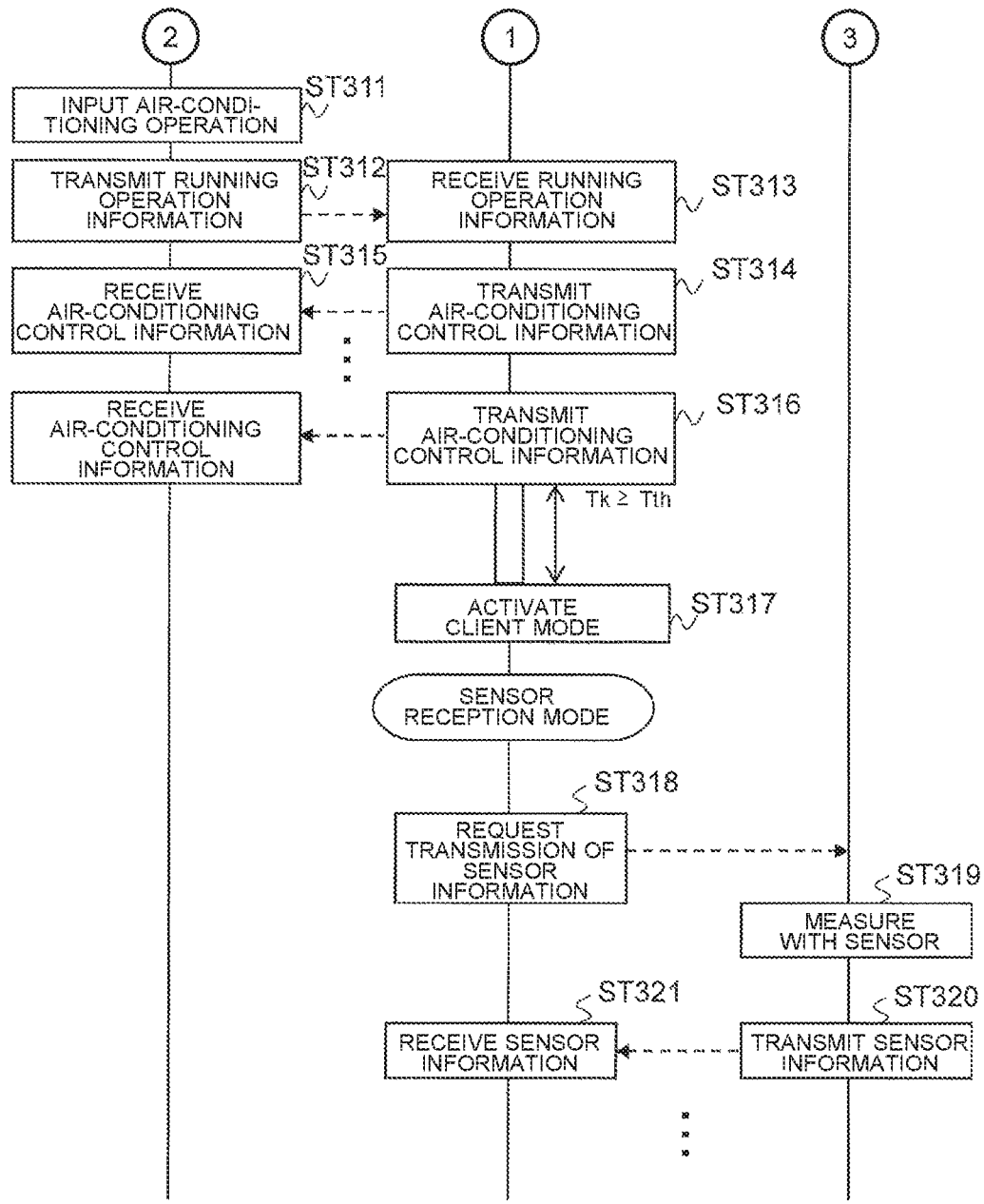
FIG. 7 is a sequence diagram illustrating an operation procedure in which a remote controller transmits and receives information while switching communication connection between connection to a wireless device and connection to an information terminal.

Next, an operation of the remote controller 1 for controlling the air-conditioning apparatus 100 by performing an operation for acquiring user-set operation information from the information terminal 2 and an operation for acquiring sensor information from the wireless device 3 at the same time, will be explained. FIGS. 6 and 7 are sequence diagrams illustrating an operation procedure of the remote controller for transferring information by switching communication connection between connection to the wireless device and connection to the information terminal.

When power is applied to the remote controller 1, the mode switching unit 13 activates the client mode (step ST301). Accordingly, the mode switching unit 13 is shifted to the sensor reception mode. When power is applied to the wireless device 3, the server function unit 31 activates the server mode (step ST302). Accordingly, the wireless device 3 is shifted to the sensor measurement mode.

When a user of the air-conditioning apparatus 100 operates the information terminal 2 to input an instruction to execute the air-conditioning operation program, the controller 20 executes the air-conditioning operation program to activate the air-conditioning operation management unit 21. Then, the air-conditioning operation management unit 21 activates the client mode (step ST303). The air-conditioning operation management unit 21 is shifted to the air-conditioning operation mode.

To acquire sensor information from the wireless device 3, the mode switching unit 13 of the remote controller 1 transmits a sensor information transmission request to the wireless device 3 via the wireless communication line 4 in a constant cycle (step ST304). Wireless communication is performed by the wireless communication control unit 11 and the wireless communication unit 16.

When the wireless device 3 receives the sensor information transmission request from the remote controller 1, the server function unit 31 causes the sensor 34 to perform measurement (step ST305). The server function unit 31 generates sensor information including a measurement result of the sensor 34. The server function unit 31 transmits the sensor information to the remote controller 1 via the wireless communication line 4 (step ST306). Wireless communication is performed by the wireless communication control unit 32 and the wireless communication unit 33. The mode switching unit 13 of the remote controller 1 receives the sensor information from the wireless device 3 (step ST307), stores the acquired sensor information into the sensor information database part 14, and updates the sensor information stored in the sensor information database part 14. After that, steps ST304 to ST306 are repeated in a constant cycle.

In step ST304 illustrated in FIG. 6, the remote controller 1 transmits the sensor information transmission request to the wireless device 3. However, as in the case illustrated in FIG. 5, the wireless device 3 may provide the sensor information to the remote controller 1 even if no request is received from the remote controller 1. In this case, the server function unit 31 of the wireless device 3 performs sensor measurement in ST305 and sensor information transmission in step ST306 in a constant cycle. The remote controller 1 stores sensor information received from the wireless device 3 in a constant cycle.

In step ST308 illustrated in FIG. 6, the air-conditioning operation management unit 21 requests the remote controller 1 for connection. Wireless communication is performed by the wireless communication control unit 22 and the wireless communication unit 23.

When the remote controller 1 receives a connection request from the information terminal 2, the mode switching unit 13 stops the client mode and activates the server mode (step ST309). Accordingly, the remote controller 1 is shifted to the information terminal reception mode.

Even if the remote controller 1 enters the server mode in step ST309, the wireless device 3 transmits the sensor information to the remote controller 1. The remote controller 1, which is in the information terminal reception mode, does not receive the sensor information transmitted from the wireless device 3.

The mode switching unit 13 of the remote controller 1 notifies, via the wireless communication line 4, the information terminal 2 of permission for connection (step ST310). Wireless communication is performed by the wireless communication control unit 11 and the wireless communication unit 16.

When the air-conditioning operation management unit 21 of the information terminal 2 receives permission for connection from the remote controller 1, the information terminal 2 enters a state in which the user of the air-conditioning apparatus 100 is able to input a running operation, and starts to acquire user-set operation information (step ST311 illustrated in FIG. 7).

When a running operation is input via the operation unit 26, the air-conditioning operation management unit 21 transmits user-set operation information including information of the input running operation to the remote controller 1 via the wireless communication line 4 (step ST312). Wireless communication is performed by the wireless communication control unit 22 and the wireless communication unit 23.

When the mode switching unit 13 of the remote controller 1 receives the user-set operation information from the information terminal 2 (step ST313), the mode switching unit 13 of the remote controller 1 rewrites user-set operation information stored in the air-conditioning control information database part 15 into the received user-set operation information and thus updates the user-set operation information. When the user-set operation information stored in the air-conditioning control information database part 15 is updated, the air-conditioning control unit 12 generates air-conditioning control information based on the updated user-set operation information and sensor information stored in the sensor information database part 14. Then, the air-conditioning control unit 12 transmits the generated air-conditioning control information to the controllers 65 and 75. The air-conditioning control unit 12 stores air-conditioning control information acquired from the heat-source-side unit 6 and the load-side unit 7 into the air-conditioning control information database part 15, and thus updates the air-conditioning control information.

The mode switching unit 13 reads the latest air-conditioning control information stored in the air-conditioning control information database part 15 from the memory unit 17, and transmits the read air-conditioning control information to the information terminal 2 via the wireless communication line 4 (step ST314). Wireless communication is performed by the wireless communication control unit 11 and the wireless communication unit 16.

When the air-conditioning operation management unit 21 of the information terminal 2 receives the air-conditioning control information (step ST315), the air-conditioning operation management unit 21 of the information terminal 2 generates information indicating an operating state based on the air-conditioning control information, and causes the display unit 25 to display the operating state. After that, every time that the user of the air-conditioning apparatus 100 operates the information terminal 2 to input a running operation, the processing of steps ST312 to ST314 is performed.

The mode switching unit 13 of the remote controller 1 measures an elapsed time Tk since the last communication with the information terminal 2 in step ST316. In the case where no user-set operation information is received from the information terminal 2 before the elapsed time Tk has reached a set time Tth, the mode switching unit 13 stops the server mode and activates the client mode (step ST317). Accordingly, the mode switching unit 13 is shifted to the sensor reception mode and resumes communication with the wireless device 3.

To acquire the sensor information from the wireless device 3, the mode switching unit 13 transmits the sensor information transmission request to the wireless device 3 via the wireless communication line 4 (step ST318). When the wireless device 3 receives the sensor information transmission request from the remote controller 1, the server function unit 31 causes the sensor 34 to perform measurement (step ST319), and transmits the latest sensor information to the remote controller 1 (step ST320). The mode switching unit 13 of the remote controller 1 receives the sensor information from the wireless device 3 (step ST321), stores the acquired sensor information into the sensor information database part 14, and updates the sensor information stored in the sensor information database part 14.

In step ST320, as in the case explained above with reference to FIG. 5, the wireless device 3 may transmit all the measurement values obtained by the sensor 34 during a period in which the wireless device 3 was not able to communicate with the remote controller 1 to the remote controller 1.

The case where the remote controller 1 is switched from the client mode to the sever mode when the remote controller 1 in the client mode receives a connection request from the information terminal 2 has been explained above with reference to FIGS. 5 to 7. However, a trigger for switching between the modes is not necessarily according to a connection request from the information terminal 2. For example, the remote controller 1 may adopt radio waves output from the information terminal 2 as a trigger for switching between the modes.

Specifically, the mode switching unit 13 of the remote controller 1 in the client mode causes the wireless communication unit 16 to monitor radio waves. When the wireless communication unit 16 receives radio waves from a device different from the wireless device 3, the mode switching unit 13 causes the wireless communication control unit 11 to measure the strength of the radio waves is measured. When determining that the measured strength of the radio waves is equal to or more than a predetermined threshold, the mode switching unit 13 determines that a user who is holding the information terminal 2 is approaching the remote controller 1. Then, the mode switching unit 13 is switched from the client mode to the server mode, and enters a state in which a connection request from the information terminal 2 is able to be received. However, in the case where no connection request is received from the information terminal 2 before a specific time has passed since switching from the client mode to the sever mode, the mode switching unit 13 is switched from the server mode to the client mode. This is because a person who is holding the information terminal 2 and does not intend to operate the air-conditioning apparatus 100 may be approaching the remote controller 1.

Furthermore, a connection request from the information terminal 2 to the remote controller 1 may be issued, for example, by an automatic notification unit such as advertising defined by a communication method, such as Bluetooth® Low Energy, after the air-conditioning operation management unit 21 is activated.

In the case where multiple people wish to operate running of the air-conditioning apparatus 100 and connection requests are issued from multiple information terminals 2, the remote controller 1 needs to determine which information terminal's operation is to be effective. In this case, the mode switching unit 13 of the remote controller 1 may make the determination based on whether or not the strength of radio waves transmitted from each of the information terminals 2 is equal to or more than a threshold. Specifically, in the case where the strength of radio waves measured when the mode switching unit 13 is in the client mode is equal to or more than the threshold, the mode switching unit 13 is shifted from the client mode to the server mode and permits a request for connection from the corresponding information terminal. In contrast, in the case where the measured strength of radio waves is less than the threshold, the mode switching unit 13 maintains the client mode and does not permit the request for connection from the corresponding information terminal. Furthermore, in the case where the strength of radio waves equal to or more than the threshold is measured for multiple information terminals 2, the mode switching unit 13 may permit connection for the information terminal 2 with the highest strength. In this case, in the case where multiple people are in a state that may be affected by the air-conditioning apparatus 100, a person who is present closest to the remote controller 1 is able to operate running of the air-conditioning apparatus 100. Accordingly, the mode switching unit 13 of the remote controller 1 is not only able to restrict a running operation of the air-conditioning apparatus 100 but also restrict access to information stored in the memory unit 17.

The remote controller 1 according to Embodiment 1 includes a function for switching between the client mode in which the remote controller 1 acquires sensor information from the wireless device 3 and the server mode in which the remote controller 1 receives user-set operation information from the information terminal 2 and provides air-conditioning control information to the information terminal 2.

According to Embodiment 1, by allowing the remote controller 1 to switch between the client mode and the server mode, a remote operation by the information terminal 2 and collection of sensor information from the wireless device 3 can be performed at the same time. Because a user does not need to perform an operation for causing the remote controller 1 to switch between a remote operation by the information terminal 2 and collection of sensor information from the wireless device 3, the burden on the user for performing such an operation can be reduced.

REFERENCE SIGNS LIST

1 remote controller, 2 information terminal, 3 wireless device, 4 wireless communication line, 5 transmission line, 6 heat-source-side unit, 7 load-side unit, 8 refrigerant circuit, 10 controller, 11 wireless communication control unit, 12 air-conditioning control unit, 13 mode switching unit, 14 sensor information database part, 15 air-conditioning control information database part, 16 wireless communication unit, 17 memory unit, 20 controller, 21 air-conditioning operation management unit, 22 wireless communication control unit, 23 wireless communication unit, 24 memory unit, 25 display unit, 26 operation unit, 30 controller, 31 server function unit, 32 wireless communication control unit, 33 wireless communication unit, 34 sensor, 50 air-conditioning control device, 61 compressor, 62 four-way valve, 63 heat-source-side heat exchanger, 64 expansion valve, 65 controller, 71 load-side heat exchanger, 72 indoor fan, 73 indoor sensor, 75 controller, 100 air-conditioning apparatus.

The invention claimed is:

1. A remote controller comprising:

an antenna circuit and an amplification circuit wirelessly communicating with a wireless device transmitting sensor information serving as an environmental index for an air-conditioning target space for an air-conditioning apparatus and wirelessly communicating with an information terminal transmitting user-set operation information of a user of the air-conditioning apparatus; and a controller configured to transmit the sensor information and the user-set operation information to a main body of the air-conditioning apparatus, and switch between a client mode, in which the sensor information is acquired from the wireless device, and a server mode, in which the user-set operation information is received from the information terminal and the controller provides air-conditioning control information corresponding to the user-set operation information to the information terminal, wherein the controller operates as a client device during the client mode, acquiring the sensor information from the wireless device, operates as a server device during the server mode, receiving the user-set operation information from the information terminal and providing the air-conditioning control information corresponding to the user-set operation information to the information terminal, and switches between the client mode and the server mode in accordance with which one of the wireless device and the information terminal the antenna circuit and the amplification circuit wirelessly communicates with.

2. The remote controller of claim 1, further comprising:

a memory unit storing the sensor information, the user-set operation information, and the air-conditioning control information, wherein the controller manages information stored in the memory unit.

3. The remote controller of claim 1, wherein when the controller is in the client mode and receives a connection request from the information terminal, the controller stops communication with the wireless device and is shifted from the client mode to the server mode.

4. The remote controller of claim 1, wherein the controller measures strength of radio waves transmitted from an information terminal from which connection is requested, the controller is shifted from the client mode to the server mode in a case where the measured strength is equal to or more than a set threshold, and the controller maintains the client mode and does not permit a request for connection from the information terminal in a case where the measured strength is less than the threshold.

5. The remote controller of claim 1, wherein the controller monitors radio waves transmitted from an information terminal when the mode switching unit is in the client mode, and the controller is switched from the client mode to the server mode when it is determined that there is an information terminal for which strength of the radio waves is equal to or more than the set threshold.

6. An air-conditioning apparatus comprising:

a heat-source-side unit and a load-side unit connected by a refrigerant circuit; and the remote controller of claim 1, connected to the heat-source-side unit and the load-side unit.

7. A remote controller comprising:

an antenna circuit and an amplification circuit wirelessly communicating with a wireless device transmitting sensor information serving as an environmental index for an air-conditioning target space for an air-conditioning apparatus and wirelessly communicating with an information terminal transmitting user-set operation information of a user of the air-conditioning apparatus; and a controller configured to transmit the sensor information and the user-set operation information to a main body of the air-conditioning apparatus, and switch between a client mode, in which the sensor information is acquired from the wireless device, and a server mode, in which the user-set operation information is received from the information terminal and the controller provides air-conditioning control information corresponding to the user-set operation information to the information terminal, wherein the controller transmits and receives information via the antenna circuit and the amplification circuit by switching between the client mode and the server mode in accordance with which one of the wireless device and the information terminal the antenna circuit and the amplification circuit wirelessly communicate, when the controller is in the client mode and receives a connection request from the information terminal, the controller stops communication with the wireless device and is shifted from the client mode to the server mode in a case where communication with the information terminal is interrupted during a set time, the controller is shifted from the server mode to the client mode.

8. The remote controller of claim 7, further comprising:

a memory unit storing the sensor information, the user-set operation information, and the air-conditioning control information, wherein the controller manages information stored in the memory unit.

9. The remote controller of claim 7, wherein the controller measures strength of radio waves transmitted from an information terminal from which connection is requested, the controller is shifted from the client mode to the server mode in a case where the measured strength is equal to or more than a set threshold, and the controller maintains the client mode and does not permit a request for connection from the information terminal in a case where the measured strength is less than the threshold.

10. The remote controller of claim 7, wherein the controller monitors radio waves transmitted from an information terminal when the mode switching unit is in the client mode, and the controller is switched from the client mode to the server mode when it is determined that there is an information terminal for which strength of the radio waves is equal to or more than the set threshold.

11. An air-conditioning apparatus comprising:

a heat-source-side unit and a load-side unit connected by a refrigerant circuit; and the remote controller of claim 7, connected to the heat-source-side unit and the load-side unit.

* * * * *